(12) United States Patent
Watanabe et al.

(10) Patent No.: US 9,399,491 B2
(45) Date of Patent: Jul. 26, 2016

(54) JOINT STRUCTURE FOR VEHICLE BODY MEMBER, AND VEHICLE BODY STRUCTURE

(71) Applicant: TOYOTA JIDOSHA KABUSHIKI KAISHA, Toyota-shi, Aichi-ken (JP)

(72) Inventors: Akiyoshi Watanabe, Toyota (JP); Norimasa Koreishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/513,798

(22) Filed: Oct. 14, 2014

(65) Prior Publication Data

US 2015/0102623 A1    Apr. 16, 2015

(30) Foreign Application Priority Data

Oct. 16, 2013   (JP) .................................. 2013-215569

(51) Int. Cl.
*B62D 27/02* (2006.01)
*B62D 25/04* (2006.01)
(Continued)

(52) U.S. Cl.
CPC ............ *B62D 27/023* (2013.01); *B23K 26/211* (2015.10); *B23K 26/22* (2013.01); *B23K 26/244* (2015.10); *B62D 25/04* (2013.01); *B23K 26/32* (2013.01); *B23K 2201/006* (2013.01);
(Continued)

(58) Field of Classification Search
CPC ...... B23K 9/007; B23K 15/008; B23K 26/00; B23K 26/22; B23K 26/246; B23K 28/02; B62D 25/04; B62D 27/02; B62D 27/023

USPC .......................... 296/29, 193.06, 203.01, 204
See application file for complete search history.

(56) References Cited

U.S. PATENT DOCUMENTS

2003/0107235 A1\* 6/2003 Komatsu et al. ............ 296/146.5
2013/0088049 A1\* 4/2013 Mazur et al. .................. 296/204
(Continued)

FOREIGN PATENT DOCUMENTS

JP         60-049875 A    3/1985
JP         03-057482 U1   6/1991
(Continued)

OTHER PUBLICATIONS

Japanese to English translation of JP 2010-12504; retreived Aug. 13, 2015 via the Japanese Pltform for Patent Information located at https://www.j-platpat.inpit.go.jp/web/all/top/BTmTopEnglishPage.*
(Continued)

*Primary Examiner* — Jason S Daniels
(74) *Attorney, Agent, or Firm* — Oliff PLC (57) ABSTRACT

A joint structure for a vehicle body member, the vehicle body member including at least two panel members, the at least two panel members constituting part of a vehicle body and being formed of a steel plate, the joint structure includes: spot-welds formed by spot-welding the at least two panel members to each other at a predetermined spot interval such that a predetermined clearance is formed between the at least two panel members; a laser-weld formed by laser-welding the at least two panel members to each other between the spot-welds; and an electrodeposition coating film portion that covers a surface of each of the at least two panel members, at least part of the electrodeposition coating film portion filling the clearance.

8 Claims, 5 Drawing Sheets

(51) Int. Cl.
  *B23K 26/22* (2006.01)
  *B23K 26/32* (2014.01)

(52) U.S. Cl.
  CPC ......... *B23K2201/18* (2013.01); *B23K 2203/04* (2013.01); *B23K 2203/50* (2015.10)

(56) References Cited

U.S. PATENT DOCUMENTS

2014/0377578 A1* 12/2014 Hisada et al. ............... 428/594
2015/0174702 A1*  6/2015 Fujimoto et al. ........... 428/594

FOREIGN PATENT DOCUMENTS

| JP | 04084685 A | * | 3/1992 |
| JP | 2000264247 A | | 9/2000 |
| JP | B2-3223746 | | 10/2001 |
| JP | 2010012504 A | * | 1/2010 |
| JP | A-2012-240550 | | 12/2012 |

OTHER PUBLICATIONS

Japanese to English translation of JP 2012-240550; retreived Aug. 13, 2015 via the Japanese Pltform for Patent Information located at https://www.j-platpat.inpit.go.jp/web/all/top/BTmTopEnglishPage.*
Partial translation of Jun. 16, 2015 Office Action issued in Japanese Application No. JP2013-215569.

* cited by examiner

JOINT STRUCTURE FOR VEHICLE BODY MEMBER, AND VEHICLE BODY STRUCTURE

INCORPORATION BY REFERENCE

The disclosure of Japanese Patent Application No. 2013-215569 filed on Oct. 16, 2013 including the specification, drawings and abstract is incorporated herein by reference in its entirety.

BACKGROUND OF THE INVENTION

1. Field of the Invention

The invention relates to a joint structure for a vehicle body member, and a vehicle body structure.

2. Description of Related Art

For example, Japanese Patent No. 3223746 describes a technique for forming a vehicle frame having a closed section by spot-welding a flange of an inner member (panel member) and a flange of an outer member (panel member) together. Here, in order to increase the stiffness of the frame, the spot interval of spot-welds is narrowed.

However, generally, the clearance between the inner member and the outer member is close to zero around each spot-weld. Therefore, there is a possibility that an ED coating solution (electrodeposition coating, anticorrosive base coat) does not enter the clearance. In this case, a bonding effect caused by ED coating is not obtained.

SUMMARY OF THE INVENTION

The invention provides a joint structure for a vehicle body member and a vehicle body structure, which provide a bonding effect caused by electrodeposition coating.

An aspect of the invention provides a joint structure for a vehicle body member. The vehicle body member includes at least two panel members. The at least two panel members constitute part of a vehicle body, and are formed of a steel plate. The joint structure includes: spot-welds formed by spot-welding the at least two panel members to each other at a predetermined spot interval such that a predetermined clearance is formed between the at least two panel members; a laser-weld formed by laser-welding the at least two panel members to each other between the spot-welds; and an electrodeposition coating film portion that covers a surface of each of the at least two panel members, at least part of the electrodeposition coating film portion filling the clearance.

In the joint structure according to the above aspect, the at least two panel members formed of a steel plate are joined to each other by the spot-welds formed by spot welding and the laser-weld formed by laser welding.

The spot-welds are provided at the predetermined spot interval such that the predetermined clearance is formed between the panel members. By managing the spot interval of spot welding, it is possible to provide the predetermined interval between the panel members. The electrodeposition coating solution enters the clearance to cause the electrodeposition coating film to adhere to the surfaces of the panel members, thus covering the surfaces of the panel members.

The at least part of the electrodeposition coating film fills the clearance formed between the panel members. Thus, a bonding effect caused by the electrodeposition coating is obtained between the panel members. The laser-weld is provided between the spot-welds. In the case of laser welding, it is possible to join the panel members to each other in a state where the clearance formed by spot welding is maintained. That is, with the joint structure according to the above aspect, by spot-welding the panel members at the predetermined spot interval to form the predetermined clearance between the panel members, a bonding effect caused by the electrodeposition coating film is obtained.

Another aspect of the invention provides a joint structure for a vehicle body member. The vehicle body member includes at least two panel members. The at least two panel members constitute part of a vehicle body, and are formed of a steel plate. The joint structure includes: spot-welds formed by spot-welding the at least two panel members to each other in a state where a predetermined clearance is formed between the at least two panel members; a laser-weld formed by laser-welding the at least two panel members to each other between the spot-welds; and an electrodeposition coating film portion that covers a surface of each of the at least two panel members, at least part of the electrodeposition coating film portion filling the clearance.

In the joint structure according to the above aspect, the at least two panel members formed of a steel plate are joined to each other by the spot-welds formed by spot welding and the laser-weld formed by laser welding.

The spot-welds are provided in a state where the predetermined clearance is formed between the panel members. By providing the predetermined clearance between the panel members, the electrodeposition coating solution enters the clearance to cause the electrodeposition coating film to adhere to the surfaces of the panel members, thus covering the surfaces of the panel members.

The at least part of the electrodeposition coating film fills the clearance formed between the panel members. Thus, a bonding effect caused by the electrodeposition coating is obtained between the panel members. The laser-weld is provided between the spot-welds. In the case of laser welding, it is possible to join the panel members to each other in a state where the clearance is maintained. That is, with the joint structure according to the above aspect, by joining the panel members to each other in a state where the predetermined clearance is formed, a bonding effect caused by the electrodeposition coating film is obtained.

In the joint structure according to the above aspect, a plurality of the laser-welds may be provided between the spot-welds.

With the joint structure according to the above aspect, the plurality of laser-welds are provided between the spot-welds, so it is possible to increase the spot interval of the spot-welds accordingly. That is, with the joint structure according to the above aspect, by laser-welding the panel members at multiple portions between the spot-welds, it is possible to compensate for a decrease in the stiffness of the joint structure for a vehicle body member, which arises as a result of an increase in the spot interval.

In the joint structure according to the above aspect, the laser-weld and the spot-welds may be provided along the same straight line.

With the joint structure according to the above aspect, because the laser-weld and the spot-welds are provided along the same straight line, it is possible to stabilize the size of the clearance formed between the panel members. That is, with the joint structure according to the above aspect, it is possible to stabilize a bonding effect caused by the electrodeposition coating between the panel members.

In the joint structure according to the above aspect, the predetermined clearance may be provided by a protrusion formed in the at least two panel members.

With the joint structure according to the above aspect, because the predetermined clearance is provided by the protrusion formed between the panel members, in comparison with the case where a spacer is arranged in order to provide the predetermined clearance, it is possible to reduce cost by the amount by which the spacer is not required. That is, the joint structure according to the above aspect is able to reduce cost The joint structure according to the above aspect may be applied to a vehicle body member of an upper body that constitutes a vehicle body upper part.

With the joint structure according to the aspect of the invention, the stiffness of the vehicle body member is ensured. Therefore, with the vehicle body structure according to the above aspect, by applying the joint structure according to the aspect of the invention to the vehicle body member of the upper body that constitutes the vehicle body upper part, it is possible to ensure steering stability. That is, with the vehicle body structure according to the above aspect, it is possible to ensure the steering stability of the vehicle by ensuring the stiffness of the upper body.

In the vehicle body structure according to the above aspect, the vehicle body member of the upper body may be a corner of a door opening in the upper body.

The door opening in the upper body is formed in a final joining process in welding of the joint structure, so the door opening significantly influences steering stability. Therefore, in the vehicle body structure according to the above aspect, the joint structure according to the invention is applied to the corner of the door opening in the upper body. That is, with the vehicle body structure according to the above aspect, it is possible to ensure the steering stability of the vehicle by ensuring the stiffness of the opening in the upper body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A joint structure for a vehicle body member according to an embodiment of the invention will be described with reference to the accompanying drawings. The arrow FR indicates a front side in a vehicle longitudinal direction. The arrow W indicates a vehicle width direction. The arrow UP indicates an upper side in a vehicle up-down direction. In the following description, unless otherwise specified, when a longitudinal direction or an up-down direction is used, the longitudinal direction means the vehicle longitudinal direction, and the up-down direction means the vehicle up-down direction.

Figure 1:
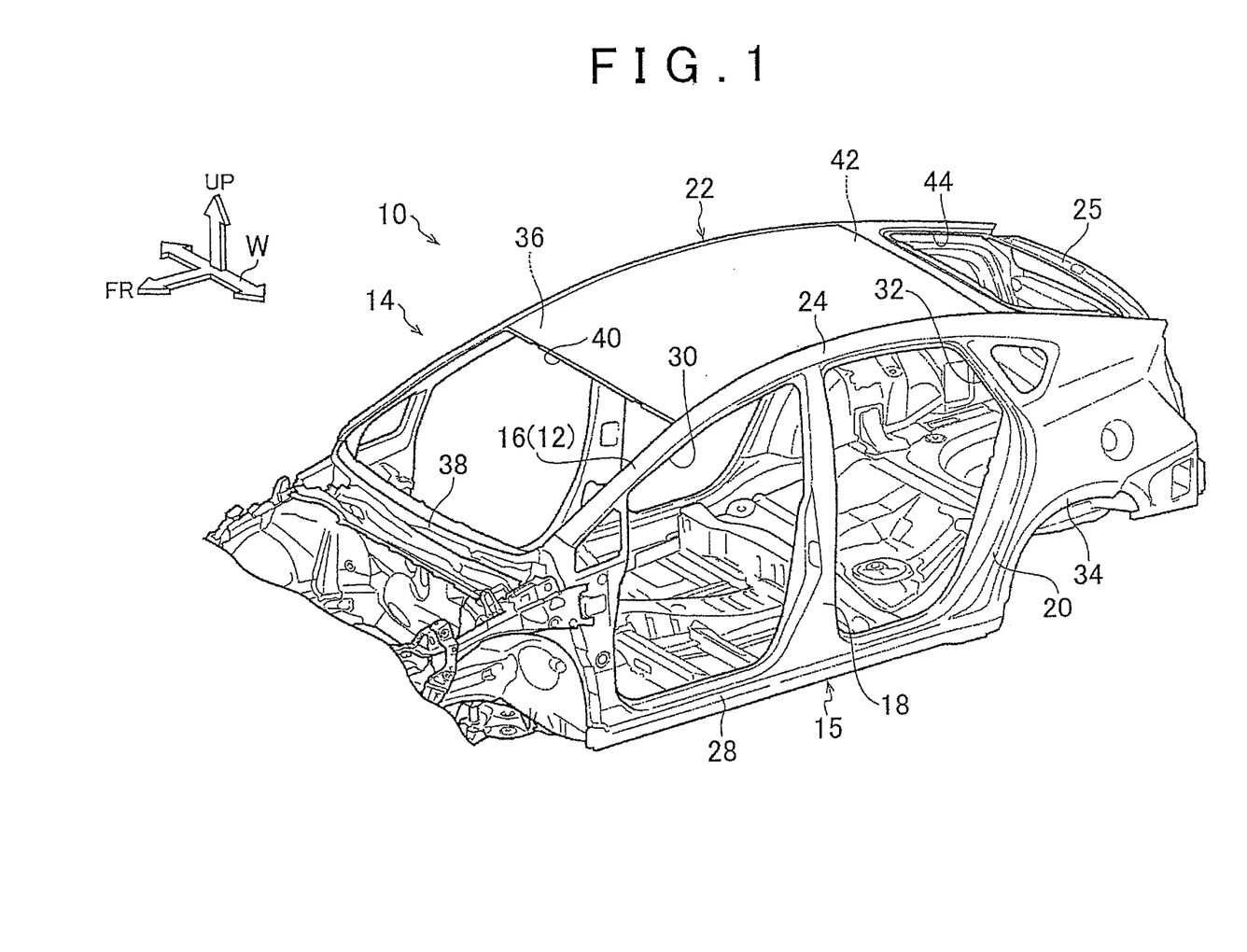
FIG. 1 is a perspective view of an upper body to which a joint structure for a vehicle body member according to an embodiment is applied.

As shown in FIG. 1, a joint structure 12 for a vehicle body member according to the present embodiment is, for example, applied to an upper body 14 of a vehicle body 10. A front pillar 16, a center pillar 18 and a rear pillar 20 are provided upright in the stated order from the vehicle front side at each vehicle body side portion 15 of the upper body 14. Each of these front pillar 16, center pillar 18 and rear pillar 20 is a columnar vehicle body frame member of which a closed sectional portion is formed of at least two panel members (described later) and is provided upright in substantially the vehicle up-down direction.

Upper end portions of the front pillar 16 and center pillar 18 are connected to a roof side rail 24. The roof side rail 24 is arranged in the vehicle longitudinal direction at each side portion of a vehicle roof portion 22 in the vehicle width direction. A roof panel 36 is provided on the inner side of each roof side rail 24 in the vehicle width direction.

Lower end portions of the front pillar 16 and center pillar 18 are connected to a locker 28. The locker 28 is arranged in the vehicle longitudinal direction at each side of a vehicle floor portion (not shown) in the vehicle width direction. Each of these roof side rail 24 and locker 28 is a vehicle body frame member of which a closed sectional portion is formed of at least two panel members and is extended in the vehicle longitudinal direction.

On the other hand, a substantially rectangular front door opening 30 is formed at a front side of a center portion of each vehicle body side portion 15. The front door opening 30 is surrounded by the front pillar 16, the center pillar 18, the roof side rail 24 and the locker 28. The front door opening 30 is opened or closed by a front side door (not shown).

A substantially rectangular rear door opening 32 is formed at a rear side of the center portion of each vehicle body side portion 15. The rear door opening 32 is surrounded by the center pillar 18, the rear pillar 20, the roof side rail 24 and the locker 28. The rear door opening 32 is opened or closed by a rear side door (not shown). A rear wheel house portion 34 is provided on a vehicle rear side to the rear pillar 20.

In addition, a substantially rectangular front windshield opening 40 is formed at a front end portion of the vehicle roof portion 22. The front windshield opening 40 is surrounded by a front header portion 36, the front pillars 16 and a cowl portion 38 that are arranged in the vehicle width direction. A front windshield (not shown) is fitted to the front windshield opening 40.

A substantially rectangular back door opening 44 is formed at a rear end portion of the vehicle roof portion 22. The back door opening 44 is surrounded by a rear header portion 42, the rear pillars 20 and a lower back portion 25 that are arranged in the vehicle width direction. A back door (not shown) is fitted to the back door opening 44.

Figure 2:
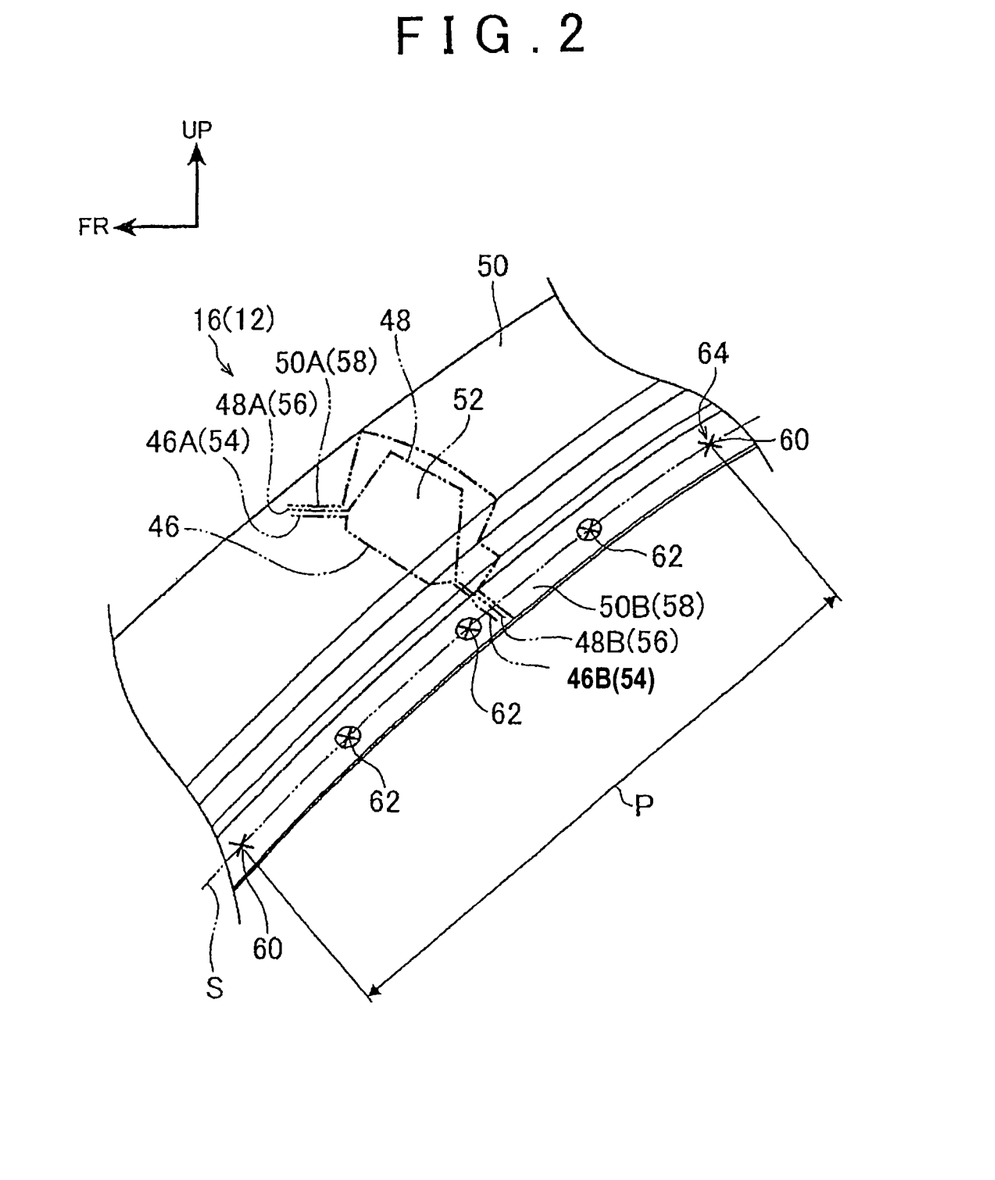
FIG. 2 is a perspective view that shows a relevant portion of a front pillar to which the joint structure for a vehicle body member according to the embodiment is applied.

For example, the front pillar 16 will be described as panel members according to the embodiment by way of example. As shown in FIG. 2, the front pillar 16 includes an inner reinforcement 46, an outer reinforcement 48 and a side member outer 50. The upper end side of the front pillar 16 is shown.

Each of the inner reinforcement 46, the outer reinforcement 48 and the side member outer 50 is formed of a long steel sheet. The inner reinforcement 46 has a hat shape in which a plane cross-sectional shape in the width direction perpendicular to the longitudinal direction is open outward in the vehicle width direction. The outer reinforcement 48 is provided on the outer side of the inner reinforcement 46 in the vehicle width direction. The outer reinforcement 48 has a hat shape in which a plane cross-sectional shape in the width direction perpendicular to the longitudinal direction is open inward in the vehicle width direction. The side member outer 50 is provided on the outer side of the outer reinforcement 48 in the vehicle width direction. The side member outer 50 has a hat shape in which a plane cross-sectional shape in the width direction perpendicular to the longitudinal direction is open inward in the vehicle width direction.

A front flange portion 46A is provided at the front end of the inner reinforcement 46. A rear flange portion 46B is provided at the rear end of the inner reinforcement 46. A front flange portion 48A is provided at the front end of the outer reinforcement 48. A rear flange portion 48B is provided at the rear end of the outer reinforcement 48. In addition, a front flange portion 50A is provided at the front end of the side member outer 50, and a rear flange portion 50B is provided at the rear end of the side member outer 50.

In the inner reinforcement 46, the outer reinforcement 48 and the side member outer 50, the front flange portions 46A, 48A, 50A are laid over and joined to one another, and the rear flange portions 46B, 48B, 50B are laid over and joined to one another. Thus, a closed sectional portion 52 is formed in the front pillar 16.

Hereinafter, for the sake of convenience of description, description will be made on the assumption that a panel member 54 includes the front flange portion 46A and the rear flange portion 46B, a panel member 56 includes the front flange portion 48A and the rear flange portion 48B and a panel member 58 includes the front flange portion 50A and the rear flange portion 50B.

These panel members 54, 56, 58 are joined to one another by spot welding and laser welding. Laser welding includes laser screw welding (LSW), linear laser welding, and the like.

Spot welding has a spot interval P of, for example, about 100 to 300 mm (spot-welds 60). Laser welding is applied at multiple portions (laser-welds 62) between the spot-welds 60. The spot-welds 60 and the laser-welds 62 are respectively welded so as to be arranged along substantially the same straight line S (joint 64). The joint 64 is provided at the side of the closed sectional portion 52 of the front pillar 16 in the panel members 54, 56, 58.

After the panel members 54, 56, 58 are joined to one another, electrodeposition coating (so-called ED coating) is applied to the vehicle body including the front pillar 16. Although not shown in the drawing, the vehicle body is immersed in a bath filled with electrodeposition paint, voltage is applied between the vehicle body and an electrode in the bath, and a coating film is precipitated by energization. After that, the vehicle body is raised from the bath, redundant paint is removed by washing the vehicle body with water, and the process of hardening the paint is performed. Because the electrodeposition coating is base coating, finish coating for decorative purposes will be applied to the vehicle body.

Next, the operation and advantageous effects of the above-described joint structure for a vehicle body member will be described.

As shown in FIG. 2, the panel members 54, 56, 58 in the front pillar 16 are joined to one another by spot welding and laser welding. The spot-welds 60 are provided at the predetermined spot interval P (here, about 100 to 300 mm) such that a predetermined clearance 66 (see FIG. 3) is formed between the panel member 54 and the panel member 56 and a predetermined clearance (see FIG. 3) is formed between the panel member 56 and the panel member 58.

Generally, although not shown in the drawing, the spot interval is about 50 mm. This is because, when the spot interval is too narrow, heat is not generated and, as a result, the panel members may not be able to be welded to one another; whereas, when the spot interval is too wide, the number of spot-welds is small and, as a result, the stiffness may not be sufficiently ensured. On the other hand, in the case of spot welding, the panel members are welded to one another by passing current between a pair of spot guns while the panel members are held and pressed by the pair of spot guns.

Figure 5:
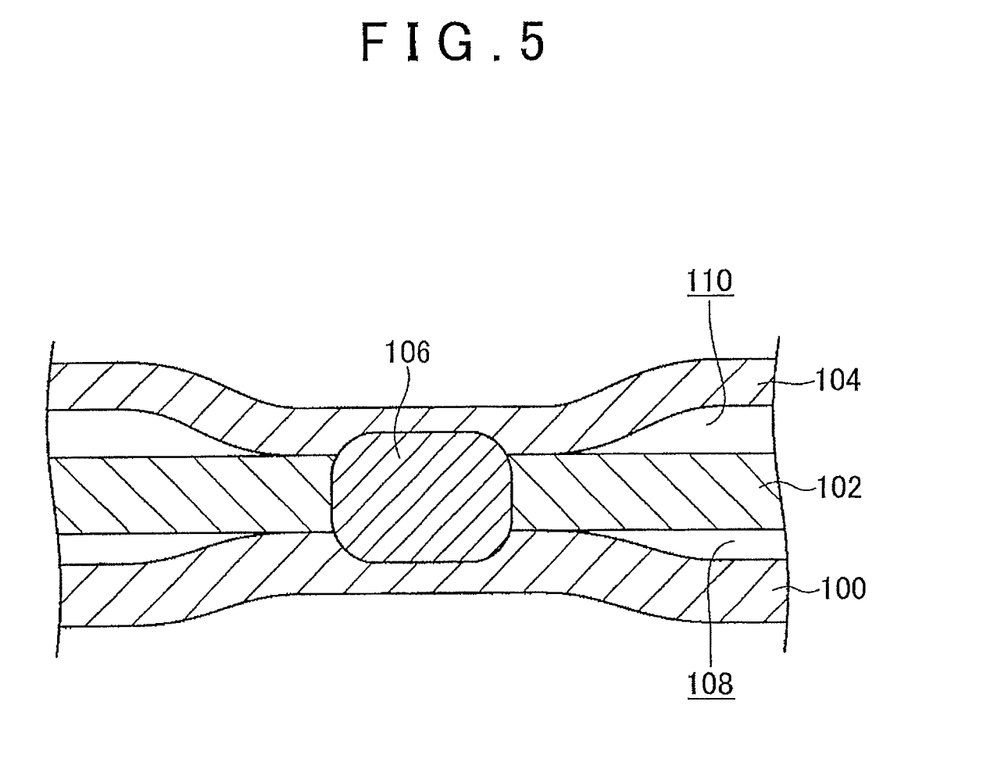
FIG. 5 is a comparative embodiment, and is a cross-sectional view corresponding to FIG. 3.

Therefore, as shown in FIG. 5, a panel member 100, a panel member 102 and a panel member 104 are pressed by the spot guns to be deformed and pressure-welded to one another. Thus, there is a possibility that, around a spot-weld 106, no clearance is provided between the panel member 100 and the panel member 102 or between the panel member 102 and the panel member 104. In this way, when no clearance is provided, an electrodeposition coating solution does not enter around the spot-weld 106.

On the other hand, when slightly distanced from the spot-weld 106, a clearance 108 is provided between the panel member 100 and the panel member 102, and a clearance 110 is provided between the panel member 102 and the panel member 104. At the spot-weld 106, the panel members 100, 102, 104 are pressed by the spot guns to be deformed, so the clearances 108, 110 increase as compared to those in the case where the panel members 100, 102, 104 are not deformed.

Thus, there is a possibility that an electrodeposition coating film adhered to the surfaces of the panel member 100 and panel member 102 does not fill the clearance 108 or an electrodeposition coating film adhered to the surfaces of the panel member 102 and panel member 104 does not fill the clearance 110. In this case, a bonding effect caused by the electrodeposition coating film is not expected between the panel members 100, 102 and between the panel members 102, 104.

Figure 3:
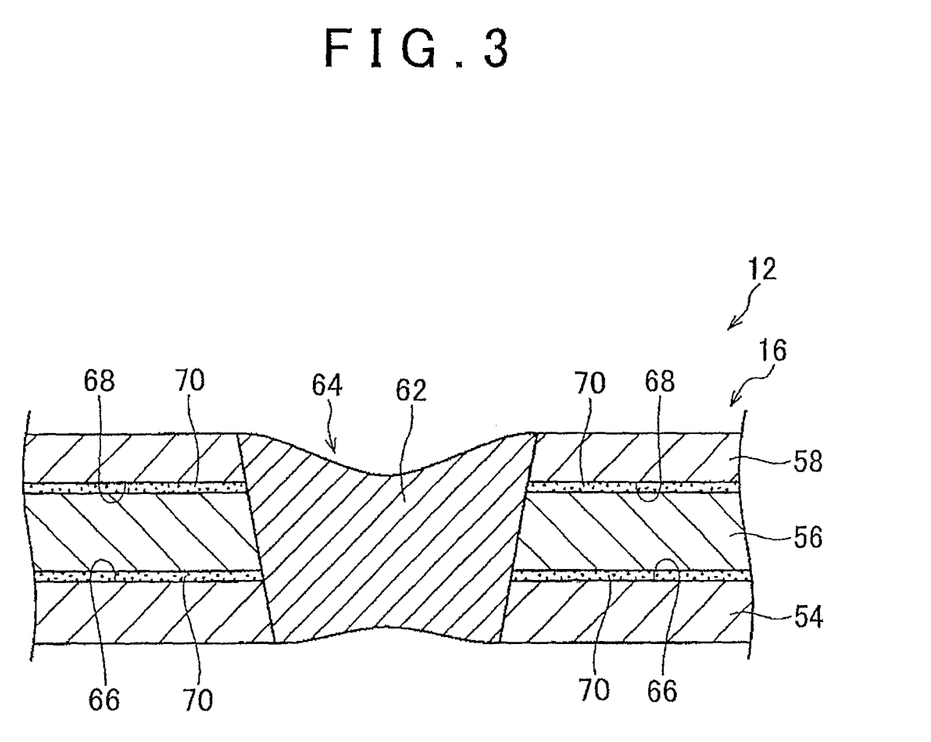
FIG. 3 is a cross-sectional view that shows a relevant portion of the front pillar to which the joint structure for a vehicle body member according to the embodiment is applied.

In contrast, as shown in FIG. 2, in the present embodiment, the spot interval P of spot welding is wider (about 100 to 300 mm) than that in the existing spot welding. By managing the spot interval P of spot welding, the predetermined clearance 66 is allowed to be provided between the panel member 54 and the panel member 56, and the predetermined clearance 68 is allowed to be provided between the panel member 56 and the panel member 58 (described later), as shown in FIG. 3.

An electrodeposition coating solution is allowed to enter the clearances 66, 68. Thus, it is possible to cause the electrodeposition coating solution to adhere to the surfaces of the panel members 54, 56, 58, and it is possible to cover the surfaces of the panel members 54, 56, 58 with the electrodeposition coating films. Thus, an anticorrosive effect improves in the front pillar 16.

When the electrodeposition coating solution hardens, a similar effect to that of a so-called adhesive agent is obtained, and connection of the joint 64 becomes tight in the front pillar 16. Accordingly, the stiffness of the front pillar 16 increases. In the present embodiment, when the electrodeposition coating solution enters the predetermined clearances 66, 68 set by managing the spot interval P of spot welding, the clearance between the panel member 54 and the panel member 56 and the clearance between the panel member 56 and the panel member 58 are filled with the electrodeposition coating films (electrodeposition coating film portions 70). The predetermined clearances 66, 68 are, for example, about 0.1 to 0.3 mm.

Thus, because of the electrodeposition coating film portions 70, a bonding effect is obtained between the panel member 54 and the panel member 56 and between the panel member 56 and the panel member 58. Thus, no structural adhesive agent is required at portions at which the electrodeposition coating film portions 70 are formed, so it is possible to reduce cost by the amount by which the structural adhesive agent is not used.

In addition, as shown in FIG. 2, laser welding is applied at multiple portions between the spot-welds 60 (laser-welds 62). In the case of laser welding, it is possible to join the panel members 54, 56, 58 with one another in a state where the clearances 66, 68 (see FIG. 3) formed by spot welding are maintained. By applying laser welding instead of spot welding, it is possible to increase the spot interval P of the spot-welds 60 in a state where the stiffness of the front pillar 16 is ensured.

In this way, by reducing the number of spot-welds 60, it is possible to reduce the portions that the electrodeposition coating solution does not enter, so an anticorrosive effect further improves in the front pillar 16. By applying laser welding at multiple portions between the spot-welds 60, it is possible to compensate for a decrease in the stiffness of the front pillar 16, which arises as a result of an increase in the spot interval P.

The laser-welds 62 and the spot-welds 60 are welded such that the laser-welds 62 and the spot-welds 60 are arranged along substantially the same straight line (the joint 64 is arranged along the straight line S). Thus, the certain clearance 66 (see FIG. 3) is obtained between the panel Member 54 and the panel member 56, and the certain clearance 68 (see FIG. 3) is obtained between the panel member 56 and the panel member 58. Thus, it is possible to stabilize a bonding effect caused by the electrodeposition coating between the panel member 54 and the panel member 56 and between the panel member 56 and the panel member 58.

Furthermore, the joint 64 is provided at the side of the closed sectional portion 52 of the front pillar 16 in the panel members 54, 56, 58. Thus, although not shown in the drawing, in comparison with the case where the joint 64 is provided at an outer periphery side (at a side away from the closed sectional portion 52), it is possible to suppress peeling between the panel member 54 and the panel member 56 and between the panel member 56 and the panel member 58 at the time when an impact load is input.

As shown in FIG. 3, in the present embodiment, the electrodeposition coating film portions 70 are respectively formed to fill the entire clearance 66 between the panel member 54 and the panel member 56 and the entire clearance between the panel member 56 and the panel member 58. Instead, at least part of the electrodeposition coating film portion 70 just needs to fill the clearance 66 or at least part of the electrodeposition coating film portion 70 just needs to fill the clearance 68.

In the present embodiment, the spot-welds 60 are provided at the predetermined spot interval P (see FIG. 2) such that the predetermined clearance 66 is formed between the panel member 54 and the panel member 56 and the predetermined clearance 68 is formed between the panel member 56 and the panel member 58; however, setting of the predetermined clearances 66, 68 is not limited to this configuration.

Figure 4A:
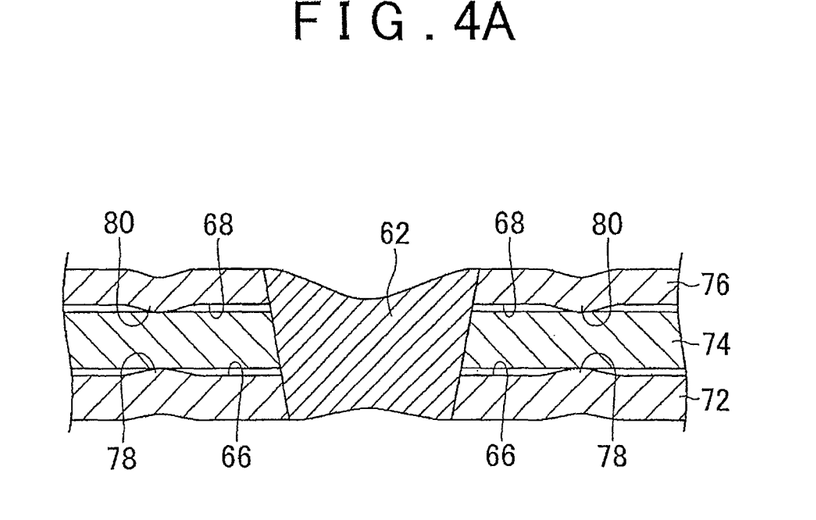
FIG. 4A is a joint structure for a vehicle body member according to an alternative embodiment to the embodiment, and is a cross-sectional view corresponding to FIG. 3.

For example, as shown in FIG. 4A, predetermined clearances may be set by providing a panel member 72 with guide locations 78 and providing a panel member 76 with guide locations 80. The guide locations 78, 80 serve as protrusions that protrude in a circular arc shape toward a panel member 74. Specifically, the predetermined clearance 66 is set by the height of each guide location 78, and the predetermined clearance 68 is set by the height of each guide location 80. In this case, in comparison with the case where spacers are arranged in order to provide the predetermined clearances 66, 68, it is possible to reduce cost by the amount by which the spacers are not required.

Figure 4B:
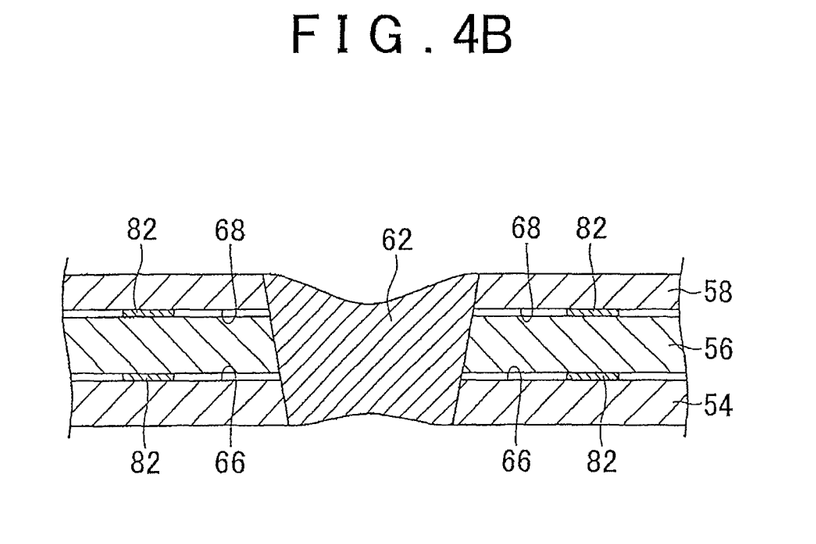
FIG. 4B is a joint structure for a vehicle body member according to an alternative embodiment to the embodiment, and is a cross-sectional view corresponding to FIG. 3.

As shown in FIG. 4B, plate-shaped metal shim jigs 82 may be inserted between the panel member 54 and the panel member 56 and between the panel member 56 and the panel member 58. The predetermined clearances 66, 68 are set by the thickness of each of the shim jigs 82; however, the shim jigs 82 are removed after completion of welding.

In the present embodiment, the front pillar 16 is described; however, the invention is, of course, applicable to the center pillar 18 and the rear pillar 20 shown in FIG. 1. In the present embodiment, joining of three panel members is described. Instead, the invention may also be applied to joining of two panel members.

The joint structure for a vehicle body member according to the present embodiment is applicable to vehicle body members, other than pillars, in the upper body 14. Those vehicle body members other than pillars, for example, include the cowl portion 38, the rear wheel house portions 34, the front door openings 30, the rear door openings 32, the front windshield opening 40, the back door opening 44, and the like. By applying the joint structure for a vehicle body member according to the present embodiment to these vehicle body members, it is possible to improve the stiffness of the upper body 14 and to ensure the steering stability of the vehicle.

The openings, such as the front door openings 30 and the rear door openings 32, are formed in a final joining process in welding of the joint structure for a vehicle body member, so the openings significantly influence the steering stability of the vehicle. Therefore, by applying the joint structure for a vehicle body member according to the present embodiment to corners of the front door openings 30, rear door openings 32, and the like, in the upper body 14, it is possible to improve the stiffness of the front door openings 30, rear door openings 32, and the like, in the upper body 14 and to further ensure the steering stability of the vehicle. The invention may also be applied to an under body in a vehicle body structure according to the present embodiment.

One embodiment of the invention is described above; however, the invention is not limited to the above-described embodiment. Of course, the invention may be implemented in various forms other than the above-described embodiment without departing from the scope of the invention.

What is claimed is:

1. A joint structure for a vehicle body member, the vehicle body member including at least two panel members, the at least two panel members constituting part of a vehicle body and being formed of a steel plate, the joint structure comprising:

spot-welds formed by spot-welding the at least two panel members to each other at a predetermined spot interval such that a predetermined clearance is formed between the at least two panel members;

a plurality of laser-welds formed by laser-welding the at least two panel members to each other between the spot-welds such that each of the plurality of laser-welds and the spot-welds are not in direct contact with each other; and an electrodeposition coating film portion that covers a surface of each of the at least two panel members, at least part of the electrodeposition coating film portion filling the clearance, wherein the laser-welds and the spot-welds are arranged along the same straight line, the straight line intersecting a center of both the laser-welds and the spot-welds.

2. A vehicle body structure comprising:

the joint structure according to claim 1, the joint structure being applied to a vehicle body member of an upper body that constitutes a vehicle body upper part.

3. The vehicle body structure according to claim 2, wherein the vehicle body member of the upper body is a corner of a door opening in the upper body.

4. A joint structure for a vehicle body member, the vehicle body member including at least two panel members, the at least two panel members constituting part of a vehicle body and being formed of a steel plate, the joint structure comprising:

spot-welds formed by spot-welding the at least two panel members to each other in a state where a predetermined clearance is formed between the at least two panel members;

a plurality of laser-welds formed by laser-welding the at least two panel members to each other between the spot-welds such that each of the plurality of laser-welds and the spot-welds are not in direct contact with each other; and an electrodeposition coating film portion that covers a surface of each of the at least two panel members, at least part of the electrodeposition coating film portion filling the clearance, wherein the laser-welds and the spot-welds are arranged along the same straight line, the straight line intersecting a center of both the laser-welds and the spot-welds.

5. The joint structure according to claim 4, wherein the predetermined clearance is provided by a protrusion formed in the at least two panel members.

6. The joint structure according to claim 4, wherein the predetermined clearance is provided by a shim jig that is inserted between the at least two panel members and that is removed after spot welding.

7. A vehicle body structure comprising:

the joint structure according to claim 6, the joint structure being applied to a vehicle body member of an upper body that constitutes a vehicle body upper part.

8. The vehicle body structure according to claim 7, wherein the vehicle body structure is applied to a corner of a door opening in the upper body.

\* \* \* \* \*